(12) United States Patent
Hoffman et al.

(10) Patent No.: US 8,082,644 B2
(45) Date of Patent: Dec. 27, 2011

(54) APPARATUS FOR THE APPLICATION OF PRESSURE RELIEF VALVES

(75) Inventors: Karl K. Hoffman, Arlington Heights, IL (US); Steve Kaganovich, Northbrook, IL (US); Thomas Roberts, Bolingbrook, IL (US)

(73) Assignee: Plitek L.L.C., Des Plaines, IL (US)

( * ) Notice: Subject to any disclaimer, the term of this patent is extended or adjusted under 35 U.S.C. 154(b) by 703 days.

(21) Appl. No.: 12/150,984

(22) Filed: May 2, 2008

(65) Prior Publication Data
US 2009/0271965 A1    Nov. 5, 2009

(51) Int. Cl.
*B23P 19/04* (2006.01)
(52) U.S. Cl. ...................................... 29/213.1; 53/128.1
(58) Field of Classification Search ................. 29/213.1; 53/128.1
See application file for complete search history.

(56) References Cited

U.S. PATENT DOCUMENTS

| | | | |
|---|---|---|---|
| 4,193,560 A * | 3/1980 | Diegel | 242/578.2 |
| 5,277,741 A * | 1/1994 | Kramer | 156/353 |
| 2008/0172985 A1* | 7/2008 | Hoffman et al. | 53/128.1 |

* cited by examiner

*Primary Examiner* — Joseph J Hail
*Assistant Examiner* — Shantese McDonald
(74) *Attorney, Agent, or Firm* — John S. Pacocha

(57) ABSTRACT

A system for applying pressure relief valves to packaging from a liner carrying adhesive backed pressure relief valves passing over a series of rollers in tension onto a peeler bar. There is a valve applicator unit proximate the peeler bar with a punch shaft and an applicator shaft with an applicator vacuum head. The liner is moved by a retraction unit including clamping members that alternately maintain the liner stationary under tension and pull the liner under tension to advance the liner carrying adhesive backed pressure relief valves. A supply reel for a roll of liner carrying adhesive backed pressure relief valves has a pair of spaced apart plates and a pair of rings with a non-stick coating positioned between each of the plates and the roll of liner. The plates, rings and roll of liner are compressed together by an adjustable retainer.

13 Claims, 3 Drawing Sheets ature of the invention

APPARATUS FOR THE APPLICATION OF PRESSURE RELIEF VALVES

BACKGROUND OF THE INVENTION

1. Field of the Invention

This invention relates generally to the application of pressure relief valves to packaging for products such as coffee, and an improved apparatus for the application of such pressure relief valves.

2. Background Art

Pressure relief valves, such as the PLITEK PLI-VALV PV-28 pressure relief valves, are applied to packaging for products, such as coffee. These valves, which may be plastic or foil, are self-adhering, thin, low profile designs supplied on a non-tearing polyester liner. The valves have an adhesive on the back side which adheres them to the liner, until the valves are removed immediately prior to the application to the packaging, and then provides for affixing the valves to the packaging. An example of the technical properties of such valves is an opening pressure differential to pressure of 0.1375 psig (9.5 milibars) and valve closure occurs after pressure drops to 0.0375 psig (2.6 milibars). The valves vent unwanted gases and seal out atmospheric gases from rigid or flexible packaging. One advantage of such valves is that they allow coffee to be packed immediately after roasting and grinding to preserve freshness. Elimination of the holding required to allow products such as coffee to degas saves time and money, while ensuring that customers receive the highest quality coffee.

Such pressure relief valves are usually applied during the packaging process, more particularly, after the containers are filled with the product. In some instances the packaging process may be a small volume operation in which the filled containers have the pressure relief valves manually applied one at a time. An automated system for the application of the valves that generally includes a base unit, a set of guide rollers, electronic and pneumatic components, a valve oiling unit, and a valve applicator unit is disclosed in Hoffman U.S. Pat. No. 7,328,543 issued Feb. 12, 2008. The base unit provides for advancing and indexing a liner strip carrying the pressure relief valves. Conveniently, the base unit may comprise an unwinder, a rewinder (for the empty liner after the valves have been applied to the packaging), electrical components, pneumatic components, control components, and a drive motor. Electronic equipment may include sensors and stepper motors, and the pneumatic components generally include a vacuum generator, regulators and filters for feeding the vacuum and pneumatic systems, as well as valves for operating pneumatic cylinders. An oil applicator, generally positioned proximate but prior to the valve applicator unit, provides oil to activate the pressure relief valve before it is applied to the packaging. The valve applicator unit conveniently comprises a punch, piercing needle, or some other device to make an opening in the packaging, a peeler bar assisting in the removal of the pressure relief valve from the liner, and a valve applicator head for attaching the pressure relief valve to the packaging in operating register with the opening made by the punch, needle or other device.

There remains a need for a low cost table top self-contained valve applicator for applying adhesive backed pressure relief valves to packaging in a small volume, semi-automatic packaging operation. Such a system will enable small packagers to put a one-way degassing valve onto a pre-made bag available from various bag manufacturers. It will allows a packer to securely place a standard valve onto a pre-made bag packed with coffee and deliver an aroma fresh package allowing for the consumer to enjoy the complete coffee experience!

SUMMARY OF THE INVENTION

The present invention is concerned with providing a system for applying an adhesive backed pressure relief valve to packaging comprising a liner carrying adhesive backed pressure relief valves. There is a series of rollers over which the liner carrying adhesive backed pressure relief valves passes in tension and a peeler bar over which the liner carrying adhesive backed pressure relief valves passes in tension. A biased, electro-mechanical micro-switch is positioned above the liner carrying adhesive backed pressure relief valves and the peeler bar. Proximate the peeler bar is a valve applicator unit including a punch shaft with a punch at one end and an applicator shaft with an applicator vacuum head mounted at one end. The punch shaft and the applicator shaft are each carried by the valve applicator unit for movement between a retracted position and an extended position There is an anvil over which packaging, to which an adhesive backed pressure relief valve is to be applied, is positioned. A liner retraction unit including clamping members that alternately maintain the liner stationary under tension and pull the liner under tension advances the liner carrying adhesive backed pressure relief valves.

There may be one or more rollers over which the empty liner passes between the peeler bar and the retraction unit. A pair of stops adjustably mounted relative to the anvil may be provided.

The system may also include a supply reel for a roll of liner carrying adhesive backed pressure relief valves with a pair of spaced apart plates between which liner carrying adhesive backed pressure relief valves is carried for rotation. A pair of rings with a non-stick coating may be positioned between each of the plates and the roll of liner carrying adhesive backed pressure relief valves. The plates, rings and roll of liner carrying adhesive backed pressure relief valves are compressed together by an adjustable retainer. A shouldered pin with a coil spring fitting over part of the shouldered pin and one end of the shouldered pin receiving a capped screw may comprise the adjustable retainer. The other, opposite end of the shouldered pin may have a transverse hole for receiving a cross-pin.

BRIEF DESCRIPTION OF THE DRAWINGS

For a better understanding of the present invention, reference may be had to the accompanying drawings in which:

FIG. 2 is an exploded perspective view of a pressure relief valve supply reel for the embodiment of a pressure relief valve applicator unit partially shown in FIG. 1; and.

DETAILED DESCRIPTION

Figure 1:
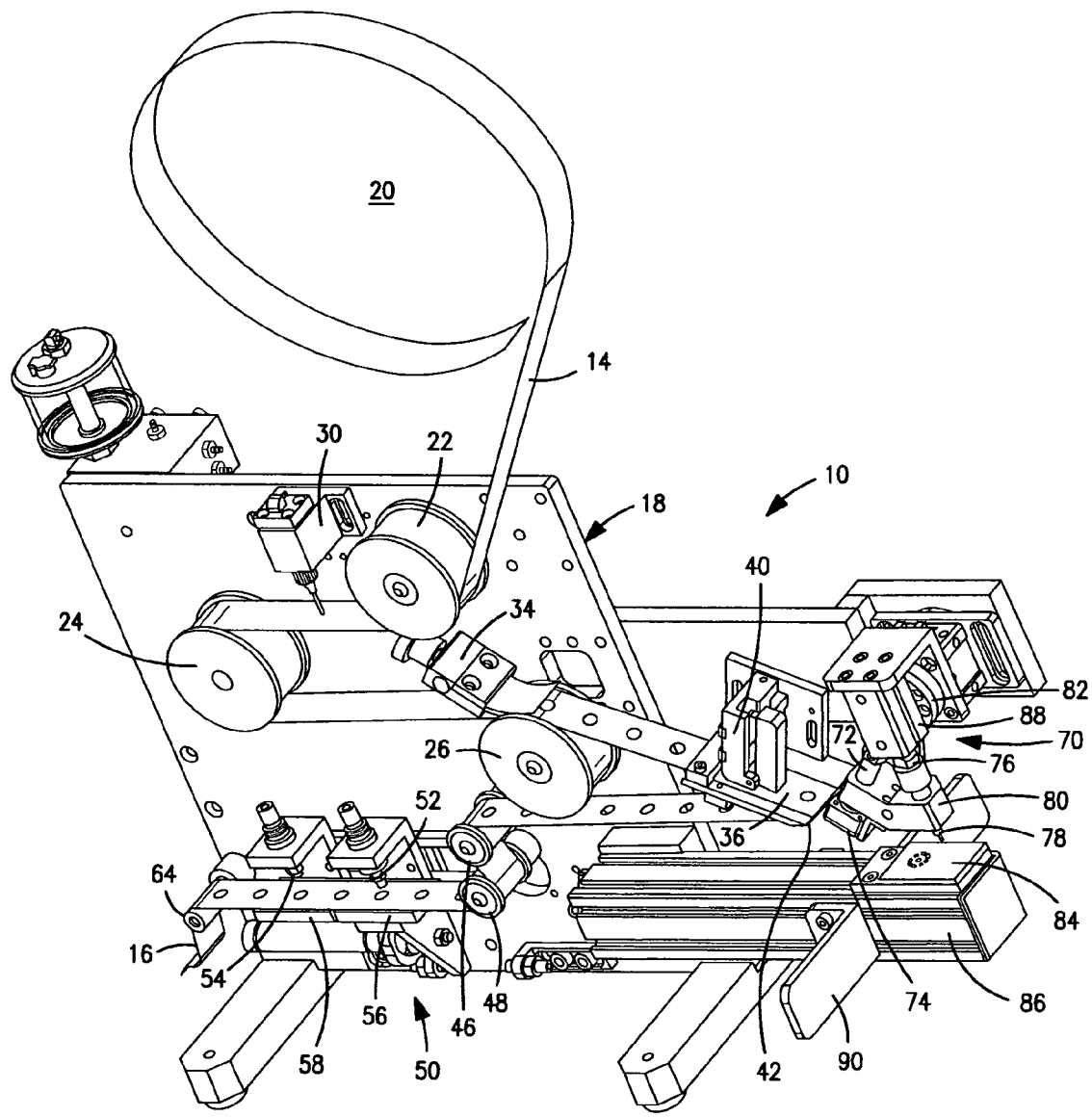
FIG. 1 is a perspective view of a portion of an embodiment of a pressure relief valve applicator unit of the present invention, including a base unit, a valve oiling unit, and an applicator unit.
Figure 2:
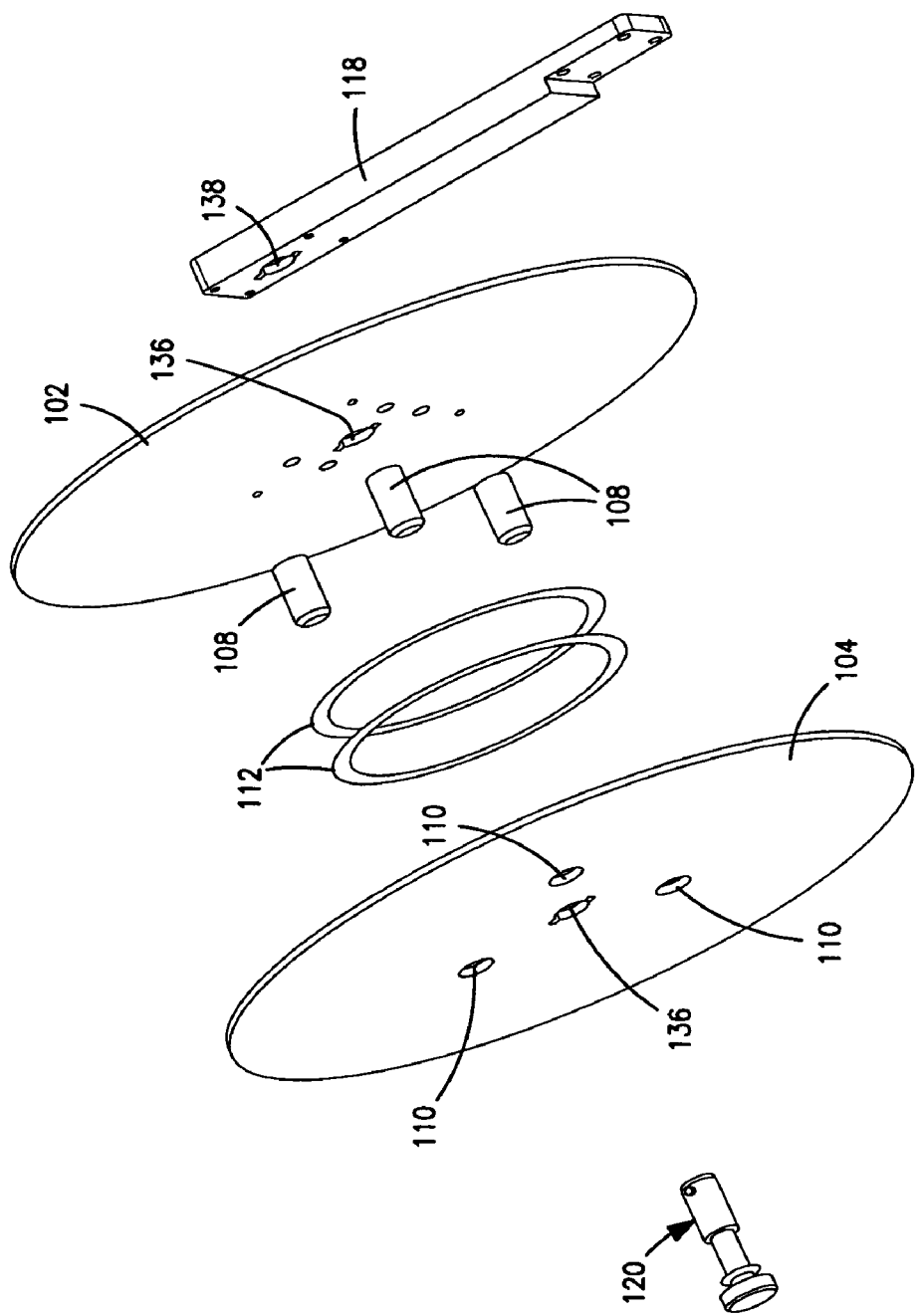

The present invention relates to the field of applying pressure relief valves to product packaging. An embodiment of the present invention, namely, a system 10 for applying pressure relief valves is shown in FIGS. 1 and 2. System 10 of the present invention is designed to be used in a semi-automatic, small volume operation for attaching pressure relief valves, such as the PLITEK PLI-VALV PV-28 adhesive backed pressure relief valves, to packages, such as filled bags of coffee grounds. In such a small volume operation the packages to which the pressure relief valves are to be attached are intermittently manually presented by an operator one at a time.

Figure 3:
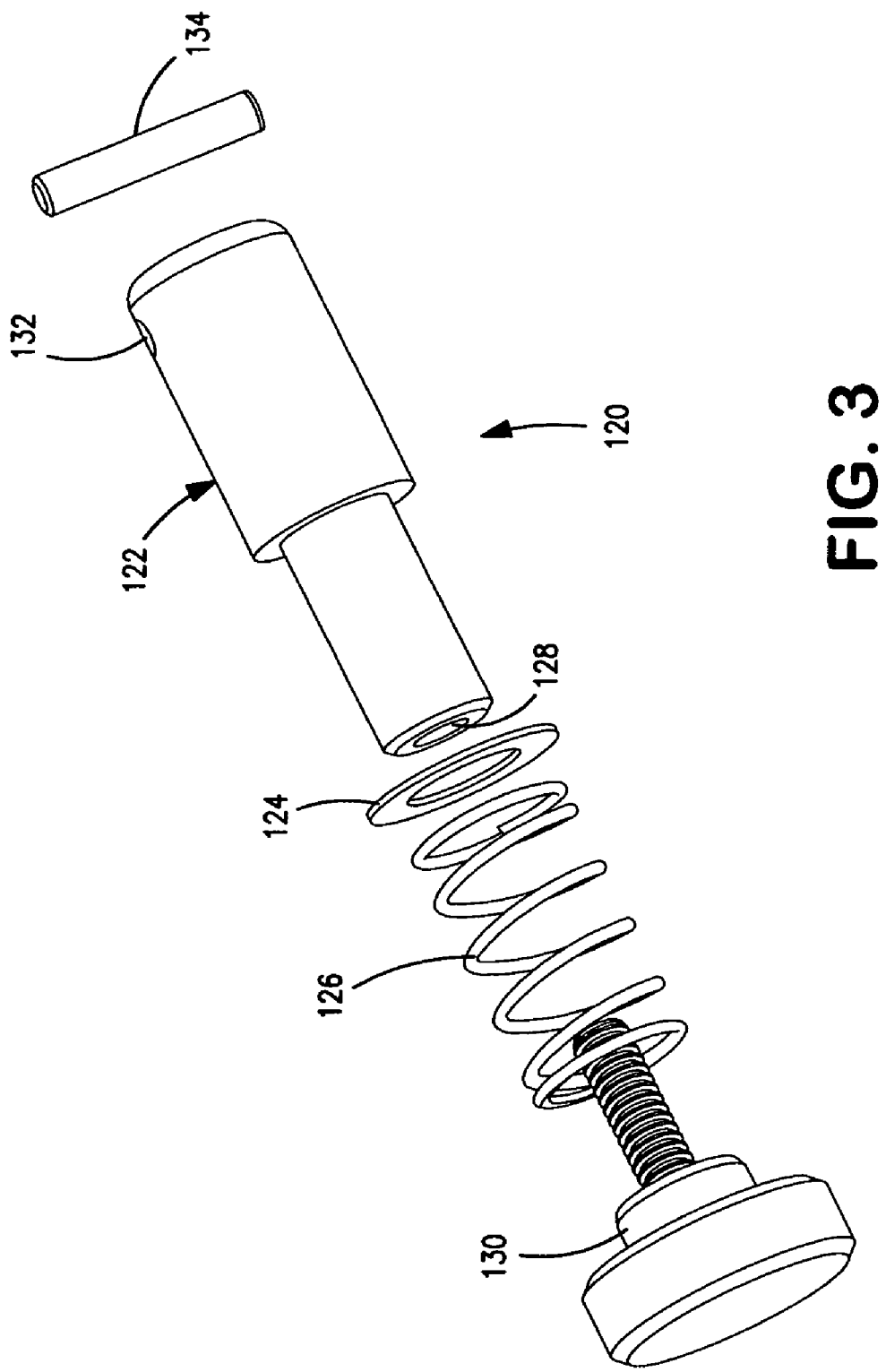
FIG. 3 is an exploded perspective view of the retainer for the pressure relief valve supply reel shown in FIG. 2.

While the adhesive backed pressure relief valves themselves are not shown in detail, there is illustrated in FIG. 1, a liner 14 carrying pressure relief valves for removal and application to the packaging and, after the valves have been applied, an empty liner 16. A base unit 18, carries a supply reel 20, shown in FIGS. 2 and 3, containing a roll of the pressure relief valve carrying liner 14. A series of guide and tensioning rollers 22, 24 and 26, which are mounted on base unit 18, assist in unwinding liner 14 carrying the pressure relief valves. An oil applicator 30, which may comprise an SMC Metering valve Part number ALIP-1000 with a Smart Products check-valve PN: 132PPB to minimize drip, is also mounted on base unit 18. A possible alternative would be an EFD 752V Series Diaphragm Valve. Applicator 30 applies oil to the pressure relief valve, before the pressure relief valve is removed from the liner for application to the packaging, as liner 14 passes between rollers 22 and 24. Additional tension control is provided by an adjustable tension brush 34 adjacent roller 26.

Liner 14 carrying the oiled pressure relief valve then proceeds, after roller 26, to peeler bar 36. Valve carrying liner is momentarily stopped on peeler bar 36 by a spring-loaded, electromechanical micro-switch positioner 40. Peeler bar 36 has an edge 42 over which liner 14 passes facilitate the removal of the adhesive backed pressure relief valve from the liner. After the valve is removed from liner 14, the empty liner 16 is pulled away over rollers 46 and 48 by liner retraction unit 50. Solenoid controlled clamping members 52 and 54 cooperate to hold and pull empty liner 16 over respective plates 56 and 58. Member or pin 52 initially applies tension to empty liner 16, and member or pin 54, powered by pneumatic cylinder 60, pulls the empty liner back when the initial tension is released. Empty liner 16 then is passed out over a roller 64. As empty liner 16 is pulled back, it advances liner 14 carrying the adhesive backed pressure relief valves from supply reel 20 around rollers 22, 24 and 26, and onto peeler bar 36.

This system is a table top concept. The apparatus is easily placed at almost any location; it requires low electrical power and only a small supply of shop air. The system does not rewind empty liner 16, which is scrap and is allowed to fall away from the system and be deposited into a simple garbage collector reducing mechanical complexity and cost.

A valve applicator unit 70, which takes the pressure relief valves, after oil or lubricant is applied by applicator 30, from liner 14 and puts the pressure relief valves on packaging is described in greater detail in Hoffman U.S. Pat. No. 7,328, 543 issued Feb. 12, 2008. Briefly, valve applicator unit 70 includes a valve applicator shaft 72 with a valve tamp applicator vacuum head 74 at one end. Head 74, under operation of a vacuum, releaseably carries the peeled pressure relief valve which has just passed over the peeler bar edge 42. Shaft 72 is carried by valve applicator unit 70 for axial movement. Valve applicator unit 70 also has a punch shaft 76 with a punch or piercing needle 78 at one end. Punch shaft 76 is also carried for axial movement.

Applicator shaft 72 and punch shaft 76 are, as shown in FIG. 1, carried by unit 70 with their respective axes at an angle to each other, such that head 74 and punch 76 are further apart than are the respective opposed ends of the shafts. A yoke 80 secures applicator shaft 72 and punch shaft 76 apart at a fixed distance proximate the applicator end of the applicator shaft and the punch end of the punch shaft. The fixed subassembly of the applicator shaft 72 and punch shaft 76 are also carried on valve applicator unit 70 for rotational movement, by a pneumatic rotary table 82, such as a SMC Series 11-MSQ Rotary Table, mounted on unit 70 through a limited angle of both clockwise and counterclockwise rotation to define a set pivotal arc of movement.

As shown in FIG. 1, punch shaft 76 is in register for punching an opening in packaging (not shown) positioned over an anvil 84 on a projecting bar 86 mounted on base unit 18. Applicator shaft 72 and punch shaft 76 are selectively rotated or pivoted together through a defined arc, counterclockwise with respect to FIG. 1, in which punch 78 is pivoted out of register and applicator vacuum head 74 is simultaneously pivoted from its starting position, in which it is picking up a lubricated pressure relief valve, into register with the opening made by punch 78 to apply the lubricated pressure relief valve on the packaging in operating register with the opening that had just been made by punch 78. Reverse, or clockwise, rotation will then pivot punch 78 back into register to punch an opening in subsequent packaging positioned over the bar and anvil, and applicator vacuum head 74 is simultaneously pivoted back to where it is shown in FIG. 1 to pick up another lubricated pressure relief valve from liner 14 as it passes over edge 42 of peeler bar 36.

A pneumatic cylinder 88 provides a single driver for direct or indirect, selective engagement with an opposed end of either punch shaft 76 to extend the punch shaft to pierce the packaging and make the opening, or applicator shaft 72 to extend the applicator shaft. When applicator shaft 72 is extended, the vacuum is removed from head 74 to affix the lubricated pressure relief valve, utilizing the same adhesive which had releaseably adhered pressure relief valve to liner 14, on the packaging in operating register with the opening. Each of punch shaft 76 and applicator shaft 72 are biased to retract from their respective extended operation.

Applicator shaft 72 and punch shaft 76 are returned as a unit to their previous respective positions, and the cycle is ready to be repeated upon the operator placing a package and initiating operation, such as by a foot pedal (not shown). A pair of stops 90 are adjustably mounted on projecting bar 86 to facilitate the approximate desired placement of the packaging over anvil 84.

FIG. 2 shows supply reel 20 for carrying a roll of liner 14 with adhesive backed pressure relief valves for rotation. Generally such a liner roll comes on a cylindrical cardboard core (not shown). Supply reel 20 includes a pair of generally circular plates 102 and 104 that are kept spaced from each other by three spacers 108. One end of each of spacers 108 may conveniently be secured to plate 102, and the other end of each of the spacers may be chamfered to facilitate their registering in openings 110 in plate 104. Spacers 108 are generally triangularly arranged and fit into the opening of the cylindrical core of a liner roll.

A pair of TEFLON non-stick coated rings 112 also fit over the spacers 108. Each ring 112 is placed between one of plates 102 and 104 and a respective end of the liner roll core. Plate 102 is bolted to an arm 118, and the assembly of the plates, rings and liner roll is held together by a tensioning retainer pin assembly 120. Arm 118 is mounted onto base unit 18.

Tensioning retainer pin assembly 120 includes a shouldered pin 122 over which a washer 124 and coil spring 126 fit. Pin 122 has a treaded hole 128 at the one end to receive a capped screw 130. The other end of shouldered pin 122 has a transverse hole 132 for receiving a cross-pin 134. Thus, shouldered pin 122 passes through a generally central opening 136 in each of plates 102 and 104, as well as opening 138 in arm 118. Cross-pin 134 prevents shouldered pin 122 from being pulled back out, and capped screw 130 is tightened to adjust the compression, through rings 112, on the liner roll to keep liner 16 under tension.

Solely as an example, the present invention has been discussed in the context of coffee packaging although it can be readily used for the packing of other food and non-comestible products. While a particular embodiment of the invention has been shown and described, alternatives, variations and modifications will occur to those skilled in the art. It is intended in the appended claims to cover all such alternatives, variations and modifications that come within the true spirit and scope of the present invention.

What is claimed as new and desired to be secured by Letters Patent is:

1. A system for applying an adhesive backed pressure relief valve to packaging comprising:
   a liner carrying adhesive backed pressure relief valves;
   a series of rollers over which the liner carrying adhesive backed pressure relief valves passes in tension;
   a peeler bar over which the liner carrying adhesive backed pressure relief valves passes in tension;
   a biased, electromechanical micro-switch positioned above the liner carrying adhesive backed pressure relief valves and the peeler bar;
   a valve applicator unit proximate the peeler bar;
   the applicator unit including a punch shaft with a punch at one end and an applicator shaft with an applicator vacuum head mounted at one end;
   the punch shaft and the applicator shaft each being carried by the valve applicator unit for movement between a retracted position and an extended position; an anvil over which packaging, to which an adhesive backed pressure relief valve is to be applied, is positioned; and
   a liner retraction unit including clamping members that alternately maintain the liner stationary under tension and pull the liner under tension to advance the liner carrying adhesive backed pressure relief valves.

2. The system of claim 1 including one or more rollers over which the empty liner passes between the peeler bar and the retraction unit.

3. The system of claim 2 including a pair of stops adjustably mounted relative to the anvil.

4. The system of claim 1 including a pair of stops adjustably mounted relative to the anvil.

5. The system of claim 1 including a supply reel for a roll of liner carrying adhesive backed pressure relief valves comprising:
   a pair of spaced apart plates between which liner carrying adhesive backed pressure relief valves is carried for rotation;
   a pair of rings with a non-stick coating positioned between each of the plates and the roll of liner carrying adhesive backed pressure relief valves; and
   an adjustable retainer keeping the plates, rings and roll of the liner carrying adhesive backed pressure relief valves compressed together.

6. The system of claim 5 in which the retainer comprises:
   a shouldered pin;
   a coil spring fitting over part of the shouldered pin;
   one end of the shouldered pin receiving a capped screw;
   the other, opposite end of the shouldered pin having a transverse hole for receiving a cross-pin.

7. A system for applying an adhesive backed pressure relief valve to packaging comprising:
   a roll of a liner carrying adhesive backed pressure relief valves;
   a supply reel for the roll of the liner carrying adhesive backed pressure relief valves;
   the supply reel having a pair of spaced apart plates between which the liner carrying adhesive backed pressure relief valves is carried for rotation;
   a pair of rings with a non-stick coating positioned between each of the plates and the roll of the liner carrying adhesive backed pressure relief valves;
   an adjustable retainer keeping the plates, rings and the roll of the liner carrying adhesive backed pressure relief valves compressed together;
   a series of rollers over which the liner carrying adhesive backed pressure relief valves passes in tension;
   a peeler bar over which the liner carrying adhesive backed pressure relief valves passes in tension;
   a biased, electro-mechanical micro-switch positioned above the liner carrying adhesive backed pressure relief valves and the peeler bar;
   a valve applicator unit proximate the peeler bar;
   the applicator unit including a punch shaft with a punch at one end and an applicator shaft with an applicator vacuum head mounted at one end;
   the punch shaft and the applicator shaft being carried by the valve applicator unit for movement between a retracted position and an extended position; an anvil over which packaging, to which an adhesive backed pressure relief valve is to be applied, is positioned; and
   a liner retraction unit including clamping members that alternately maintain the liner stationary under tension and pull the liner under tension to advance the liner carrying adhesive backed pressure relief valves.

8. The system of claim 7 including one or more rollers over which the empty liner passes between the peeler bar and the retraction unit.

9. The system of claim 7 including a pair of stops adjustably mounted relative to the anvil.

10. The system of claim 7 in which the retainer comprises:
    a shoulder pin;
    a coil spring fitting over part of the shouldered pin;
    one end of the shouldered pin receiving a capped screw; and
    the other, opposite end of the shouldered pin having a transverse hole for receiving a cross-pin.

11. The system of claim 10 including one or more rollers over which the empty liner passes between the peeler bar and the retraction unit.

12. The system of claim 10 including a pair of stops adjustably mounted relative to the anvil.

13. The system of claim 12 including a pair of stops adjustably mounted relative to the anvil.

* * * * *